United States Patent [19]

Schwartzman

[11] Patent Number: 4,620,648

[45] Date of Patent: Nov. 4, 1986

[54] PRESSURE-RESPONSIVE VALVE

[75] Inventor: Gilbert Schwartzman, Westchester, N.Y.

[73] Assignee: Dab-O-Matic Corp., Mt. Vernon, N.Y.

[21] Appl. No.: 585,754

[22] Filed: Mar. 2, 1984

Related U.S. Application Data

[63] Continuation-in-part of Ser. No. 395,111, Jul. 6, 1982, abandoned.

[51] Int. Cl.⁴ .................. B65D 25/38; B65D 35/32; F16K 15/14
[52] U.S. Cl. .................. 222/490; 137/843; 137/844; 137/845; 137/849; 222/494; 401/206; 401/264
[58] Field of Search ............... 401/264, 206, 260, 186, 401/132; 215/247, 249; 222/494, 490, 212, 213; 137/849, 846, 847, 855, 843, 852, 844, 845

[56] References Cited

U.S. PATENT DOCUMENTS

| 1,122,868 | 12/1914 | Davies | 222/490 |
| 1,989,145 | 1/1935 | Newby | 222/490 X |
| 2,252,543 | 8/1941 | Beeh | 401/260 |
| 2,557,917 | 6/1951 | Schlesinger | 222/490 |
| 2,911,664 | 11/1959 | Zecchini | 401/132 |
| 3,272,403 | 9/1966 | Alexander | 222/490 X |
| 3,410,645 | 11/1968 | Schwartzman | 401/206 X |
| 3,418,055 | 12/1968 | Schwartzman | 401/206 |
| 3,669,323 | 6/1972 | Harker et al. | 222/490 |
| 4,461,408 | 7/1984 | Shepard | 401/264 X |

FOREIGN PATENT DOCUMENTS

| 552566 | 11/1956 | Belgium | 222/490 |
| 2102398 | 2/1983 | United Kingdom | 222/490 |

Primary Examiner—Steven A. Bratlie
Attorney, Agent, or Firm—Cohen, Pontani & Lieberman

[57] ABSTRACT

A pressure-responsive valve exhibiting unusual restoring force includes an elastically deformable diaphragm having a plurality of non-intersecting, non-meeting, separate arcuate slits, each slit having a base which is intersected by at least one other slit, and each slit being out of intersecting relation with its own base.

14 Claims, 13 Drawing Figures

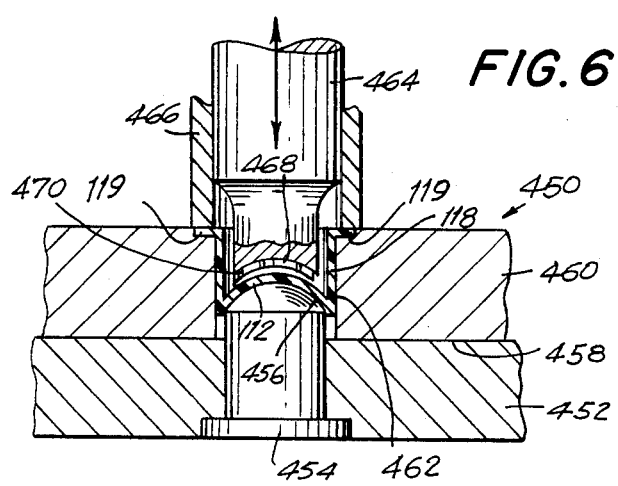
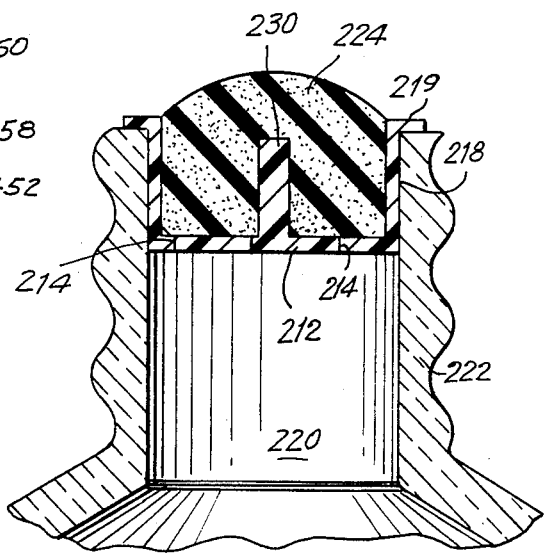
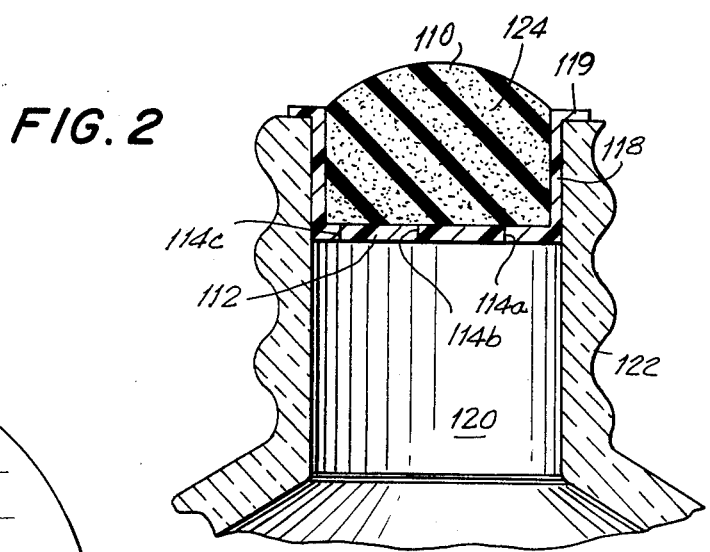
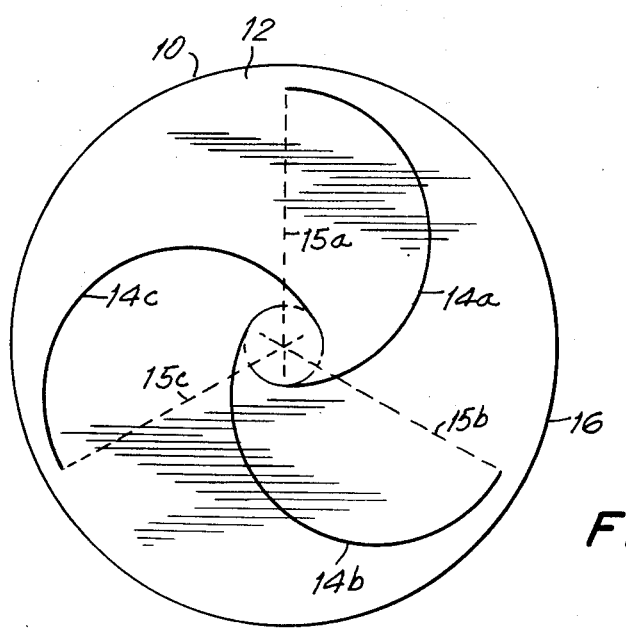

FIG. 4
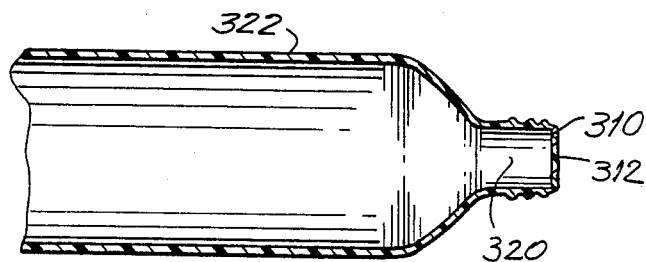
FIG. 5
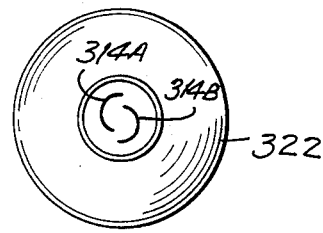
FIG. 7A
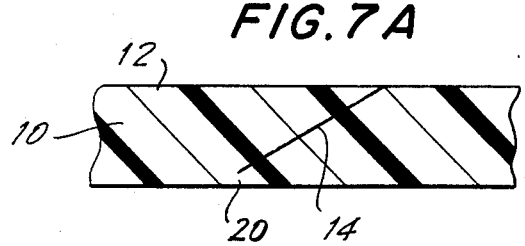
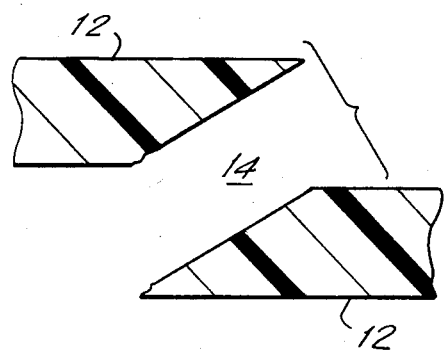
FIG. 7B

PRESSURE-RESPONSIVE VALVE

The present application is a continuation-in-part of copending application Ser. No. 395,111, filed July 6, 1982 now abandoned.

BACKGROUND OF THE INVENTION

This invention relates broadly to pressure-responsive valves for fluid dispensing containers, and is more particularly directed to a pressure-responsive valve which can also be used as a closure as well as a method for making it.

Many fluid materials, especially liquids and pastes, especially useful in the fields of personal hygiene, cosmetics and toiletries employ materials that deteriorate during a long storage. Thus, for example, many perfumes, colognes, aftershaves and the like contain alcohol as an important constituent. The evaporation of the alcohol over a long period of time deteriorates the the material. Almost everyone has experienced trying to remove toothpaste from a tube that has been left open. Often times one encounters a slight block of dried out toothpaste which prevents further use of the tube without gouging the dried material out of the neck. Similar problems arise out of the storage of lotions, creams and the like. Likewise, a variety of industrial material which employs volatile solvents may encounter similar problems.

To reduce or eliminate such problems, the present invention proposes the inclusion of a self-closing valve mechanism which is automatically opened when the contents of a container are to be dispensed and automatically closes itself upon the discontinuance of the dispensing operation, whereby to prevent deterioration due to oxidation, evaporation or other deteriorating aging phenomenon. Particularly the valve mechanism contemplated in this application is a pressure responsive valve which is self-restoring to a closed position upon removal of the actuating pressure.

The pressure-responsive valve of the present invention employs a novel slit arrangement in an elastically deformable membrane. This slit arrangement permits the valve to open upon the application or pressure to one side of the diaphragm and provides sufficient restorative force to cause the valve to close when the pressure is discontinued.

This valve may be employed in gas dispensing but it presently finds its major utility in liquid dispensing containers where pressure is transmitted to the valve either by an applicator in the mouth of the container or by squeezing the container to cause the pressurized liquid to impinge against the diaphragm and open the slits. The first arrangement is particularly suited to dabbing type applicators where the container is provided with an applicator pad which is pressed against the surface to be dabbed. The pressure applied to the applicator is transmitted to the valve causing it to open whereby fluid is permitted to flow from the container to the applicator.

Another aspect of the present invention is that the valve may be supplied in the form of a closure which is capable of being converted into a pressure-responsive valve. This is accomplished by partially cutting the slits so that they do not completely penetrate the diaphragm. The diaphragm may thus be used as a positive seal. When pessure is applied, the slits open up breaking the seal and the diaphragm is converted into a pressure-responsive valve.

Conventional pressure-responsive valves have a drawback because they are incapable of exerting sufficient restorative force to close themselves tightly after a number of open and close cycles have been completed. In a sense, they wear out. This is because they rely on simple flap action wherein the restorative force is exerted by a line of material. Examples may be found in U.S. Pat. Nos. 3,418,055 and 3,669,323.

The principal object of this invention is to provide a pressure-responsive one-way valve which opens upon the application of pressure yet exerts sufficient restorative force to return to a normally closed position upon the cessation of the application of pressure.

Another object of this invention is to provide a closure for a container affording a positive seal to protect against evaporation which can be broken upon the application of pressure and thereby converted into a pressure-responsive valve.

Another object of this invention is to provide a liquid dispensing device employing the valve of the present invention.

Another object of this invention is to provide a means for concentrating the restorative force of an applicator pad so as to add the restorative force of the pad to the restorative force of the valve.

A further object of this invention is to provide a method for cutting slits in a planar diaphragm at an angle to the plane of the diaphragm, other than at a right angle.

BRIEF DESCRIPTION OF THE DRAWINGS

FIG. 1 is a front view of one form of valve embodying the present invention;

FIG. 2 is a vertical sectional view of a fluid applicator including a modified valve of the present invention;

FIG. 3 is a vertical sectional view like FIG. 2 showing yet another modification;

FIG. 4 is a longitudinal sectional view of a tube for paste or other flowable material which is controlled by a valve embodying the present invention;

FIG. 5 is an end view of FIG. 4 looking from the right of FIG. 4;

FIG. 6 is a view partly in section and partly in elevation showing an apparatus for putting slits into diaphragms for valves embodying the present invention which slits are at an angle to the plane of the diaphragm;

FIG. 7a is a fragmentary sectional view of a portion of a diaphragm-closure in which slits extend only partially through the diaphragm material, whereby to permit the diaphragm to continue to serve as a closure;

FIG. 7b is a view like FIG. 7a after the diaphragm material has been broken along the slit thereby to convert the closure of FIG. 7a into the valve of FIG. 7b;

DESCRIPTION OF THE PREFERRED EMBODIMENTS

Figure 8:
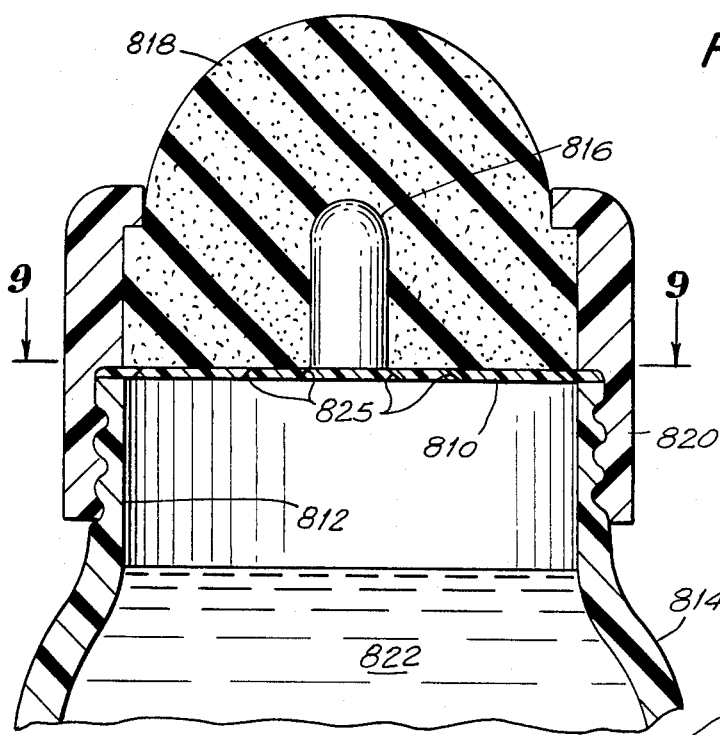
FIG. 8 is a vertical cross-sectional view of container outlet showing a valve according to the present invention in closed position.

Referring first to FIG. 1, the basic concept of the present invention is the provision of a self-restoring or self-closing openable valve formed from a diaphragm of elastically deformable material. Such a valve is esignated by the reference numeral 10 and comprises a diaphragm 12 of elastically deformable material. The diaphragm 12 is preferably planar although other configurations may be employed. In order to serve as a valve, the material from which the elastically deformable diaphragm is made is preferably impermeable to the fluid, the flow of which is to be controlled by the valve 10. For most applications the diaphragm 12 can be made of metal or plastic, elastically deformable metal such as certain steels being useful for certain applications and a variety of elastically deformable plastic material being also imminently usable. Among the plastics which appear to have important utilities in this invention are polyethylene, polypropylene, polyvinylchloride and polystyrene.

In accordance with the present invention the diaphragm 12 is provided with two or more arcuate slits, here shown as three in number, 14a, 14b and 14c. Each of the slits 14 is shown to be circular, that is of fixed radius, although other curve forms may be employed in defining the arcuate slits 14. Thus, for example, the slits may be portions of spirals or helixes or a part of a sign curve or an Archimedes spiral, etc.

Extending between the two ends of each arcuate slit 14a, 14b and 14c is an imaginary line hereinafter referred to as the "base" of the slit. The bases are designated with the reference characters 15a, 15b and 15c, respectively. In accordance with the invention, at least one of the arcuate slits must intersect the base of another of the slits and should not curve around to intersect its own base. Preferably, the slits are equiangularly distributed on the diaphragm 12 and each slit 14 intersects the adjacent base 15 without curving back to intersect itself. Thus, for example, as shown in FIG. 1, the base 15a of slit 14a is intersected by slit 14c; base 15b of slit 14b is intersected by slit 14a; and base 15c of slit 14c is intersected by slit 14b. None of the slits 14a, 14b and 14c curve back to intersect its own respective base 15a, 15b and 15c.

The diaphragm 12 is disposed over or in an opening in a container such as a deformable (squeeze) bottle, a tube or the like in which is disposed flowable material such as a liquid or a paste, although in certain instances gases might be so stored, to normally prevent fluid flow out of the container. The valve is normally closed, that is undeformed with the slits closed. The valve may be operated to its open position by pressurizing the contents of the container against the inner surface of the diaphragm to apply a pressure differential across the diaphragm such that an outer directed force will cause the valve to flex outwardly to open it along the slits 14a, 14b and 14c. The flexing of the diaphragm 12 causes a rotation of one portion of the diaphragm relative to the other portion of the diaphragm as it moves outwardly in response to the force resulting from the pressure differential. Hence this diaphragm valve acts similarly to a helical spring, and employs the elastic restoring force of the entire diaphragm rather than the relatively smaller amount of force that would be available if the valve were a prior art flap valve which flexed only at the base lines 15a, 15b or 15c. Accordingly, upon relaxation of the inner pressure, the restoring force will be sufficient to cause the deflected portion of the diaphragm to rotate in the opposite direction from the direction of rotation experienced upon opening of the valve to permit the deformed diaphragm portion to move back into the plane of the diaphragm to close the valve.

Turning now to FIG. 2, the basic valve 10 of FIG. 1 is shown in somewhat modified form 110 incorporated in the neck 120 of a bottle 122 as a combined valve and applicator. The valve 110 and applicator includes a diaphragm 112 of substantially identical configuration to the diaphragm 12 of FIG. 1 save that the peripheral edge 16 of the diaphragm 12 is integrally formed with an upwardly extending peripheral wall portion 118 that is sealingly disposed, as by pressed fitting, in the neck 120 of the bottle 122, whereby to effect a seal and a seat for an applicator pad 124 to be described hereinafter. Desirably, although not necessarily, the peripheral wall 118 may have an outwardly directed flange 119 to enhance the seal between the diaphragm 112 and the bottle 122. In accordance with this FIG. 2 modification of the present invention, an applicator pad 124 is made of a material that is permeable to the fluid contained within the bottle. Such an applicator pad may be made of an open cellular form material or the like as is known in the prior art. Such materials are themselves elastically deformable which is desirable in this embodiment of the present invention.

It will be noted that the diaphragm 112 and the wall 118 between them define a cylindrically shaped receptacle into which can be press-fitted, glued or otherwise sealed the applicator pad 124, preferably with the lower end thereof up against the diaphragm 112. Depending upon the mode of use, if the bottle 122 is deformable, such as a squeeze bottle or the like, the bottle may be squeezed, whereby to pressurize the liquid therein. The pressurized liquid adjacent the diaphragm 112 causes the diaphragm to flex upwardly as viewed in FIG. 2 in the manner previously described with respect to FIG. 1. This will permit the liquid in the bottle to flow through the open slits 114 in diaphragm 112 of valve 110 and into the applicator pad 124 and finally through that open cellular structure for application to a surface, such as skin or the like. Upon releasing the squeezing force from the bottle, the inherent elasticity or resiliency of the diaphragm 112 will tend to restore the diaphragm to its closed position as viewed in FIG. 2. Enhancing the closing force will be the inherent elasticity of the elastically deformable pad 124, whereby to further insure a complete closure after use.

Turning to FIG. 3, this figure is essentially the same as FIG. 2, but showing a modification in which a means is included for concentrating the restoring force of the pad 224 at the center of the diaphragm 212. This force concentrating means is here shown to be a pin 230, preferably formed integrally with the diaphragm 212, and extending upwardly into the applicator pad 224, whereby to transmit more of the restoring force of the form to the center of the diaphragm 212. In certain applications, this concentrating action may be found to be desirable. Accordingly, when the contents of container 222 are pressurized, the contents move into the container neck 220 and press against the diaphragm 212 and cause it to deform outwardly of the neck of the bottle, whereby to permit the contents of the bottle to flow through the now open slits 214 and into the applicator pad 224. The applicator pad being itself an open cellular structure, the contents will flow through the pad and then on to the surface to which the material is being applied. When pressure is released, the applicator pad, previously deformed during the application action, will restore itself to the undeformed position illustrated in FIG. 3. The force of self restoration from the pad will be concentrated at the center of the diaphragm by virtue of the inclusion of the pin 230, to further aid in the closing of the diaphragm 212.

Alternatively, the applicators of FIGS. 2 and 3 can be operated to their open positions, not by the pressurizing of a squeeze bottle but, instead, by the application of an axial force inwardly of the neck of the bottle, as by applying the applicator pad to an external surface to deform the applicator pad inwardly. The applicator pad being deformed inwardly will apply an inwardly directed pressure on the diaphragms 112 and 212 to deflect a portion of the diaphragm inwardly relative to the remainder of the diaphragm, whereby to open the slits and hence the valve. Upon removing the applicator from the surface to which the contents of the bottle 122 or 222 are being applied, the force causing the valve to open will be removed and the restoring force of the diaphragm 112 or 212 will cause the valve to move to a closed condition. In FIG. 3, by virtue of the coupling of the pad to the diaphragm through the pin 230, the restoring force of the pad will be added to the restoring force of the diaphragm at the center thereof, whereby to assist in the closure of the valve comprising the slitted diaphragm.

As already noted, among the kinds of materials the flow of which can be controlled by the valve mechanisms of the present invention, are paste-like materials contained in squeezable tubes. Such materials are commonly in the form of salves, ointments and pastes such as, for example, toothpaste or the like. Such an application of the invention is disclosed in FIGS. 4 and 5. Referring now to FIGS. 4 and 5, the valve 310 comprises a diaphragm 312 that is formed integrally with a squeezable tube such as a plastic squeezable tube 322. Of course, the plastic should be impermeable to the flowable material and elastically deformable. The diaphragm 312 which preferably is integral with the tube and extends across the neck of the tube in sealed relation therewith is slitted as the diaphragm 12 of FIG. 1 save for the fact that in FIGS. 4 and 5 the diaphragm is provided with only two slits 314a and 314b, both of which are arcuate, that is circular, helical, sinusoidal or the like, and each of which intersects the base of the other without curving back to intersect its own base. Preferably, and as shown in FIG. 5, the slits are arranged symmetrically on the diaphragm 312. Assuming the squeezable tube 322 is filled with an ointment or paste-like material such as, for example, toothpaste or the like, when the tube 322 is squeezed, the material will tend to move from left to right as viewed in FIG. 4 whereby to apply a pressure in the neck 320 of the tube. This pressure will be applied against the diaphragm 312 to cause it to flex outwardly of the tube, to thereby cause a portion thereof to rotate in a clockwise direction as viewed in FIG. 5, whereby to open the slits 314a and 314b to permit the toothpaste or other paste or salve material to pass therethrough. Upon releasing the tube 322, the pressure on the diaphragm valve 310 will be relieved and the diaphragm will self restore to its substantially planar condition by virtue of the inherent elasticity of the material to reseal the tube and prevent drying or caking of the contents in the neck.

While the embodiment of FIGS. 4 and 5 is shown with only two slits, each of which intersects the base of the other and neither of which curves far enough to reintersect its own base, it will be understood that the invention of FIGS. 4 and 5 can be employed with a diaphragm having 3, 4 or more slits in the same manner as the valve 10 of FIG. 1.

In all of the embodiments herebefore described, the slits 14, 114, 214 and 314 are all shown as extending perpendicular to the plane of the diaphragms 12, 112, 212 and 213, respectively. With such an arrangement, the valve may act as a two-way valve, that is it can flex in either direction to open. If it is desired for the valve to operate in only one direction, that is, for example, outwardly as viewed in FIG. 4, then the slits 14, rather than being provided in a direction perpendicular to the plane of the diaphragm 12, may be provided at an angle thereto. Referring for example to FIG. 7b, it will be seen that with slits directed as shown in FIG. 7b, pressure only in the upward direction can operate the valve to open it, pressure differential in the downward direction serving only to enhance the seal of the valve. This will cause the valve to act as a one-way valve opening only in one direction, namely in the upward direction as viewed in FIG. 7b. Such slits can be provided in any and all of the embodiments hereinbefore shown and described in FIGS. 1 through 5, and modifications thereof.

Turning now to FIG. 7a, a fragmentary structure is shown wherein an angular slit 14 is shown extending only part way through the diaphragm 12 of a valve mechanism 10. While the structure of FIG. 7a is shown to be one with an angular slit 14 that makes the valve a one-way valve, this same partial slitting structure may be employed with slits extending perpendicular to the plane of the diaphragm 12 as well. In accordance with the present invention, the slits 14, whether perpendicular to the plane of the diaphragm 12 or at an angle thereto, do not extend all the way through the diaphragm 12, whereby to maintain the integrity of the diaphragm as a seal since it is formed of material which is impermeable to the fluid, liquid, paste or gas, the flow of which it will control. However, zones of weakness have been provided in such a diaphragm 12 which permits the relatively easy breaking of the diaphragm by pressing it either manually or by merely applying the usual dispensing force to the fluid in the form of squeezing a bottle or a tube or applying applicator pad to a surface to be applied, be it the skin or some other surface. Upon applying such a force, the thin depth of the diaphragm 12 not slitted by the original partial slit 14 will break, as may be seen in FIG. 7b whereby to convert the breakable closure of FIG. 7a into a valve such as, for example shown in FIG. 7b. Again, while the valve of FIG. 7b is shown as a one-way valve, if the slit 14 were perpendicular to the plane of the diaphragm 12, then the valve when formed by breaking through the unslitted parts of the diaphragm will serve to a two-way valve. The partial but not complete slitting of any of the diaphragms may be employed in connection with any of the previous embodiments of the present invention without departing from the scope of the embodiments so described.

Figure 9:
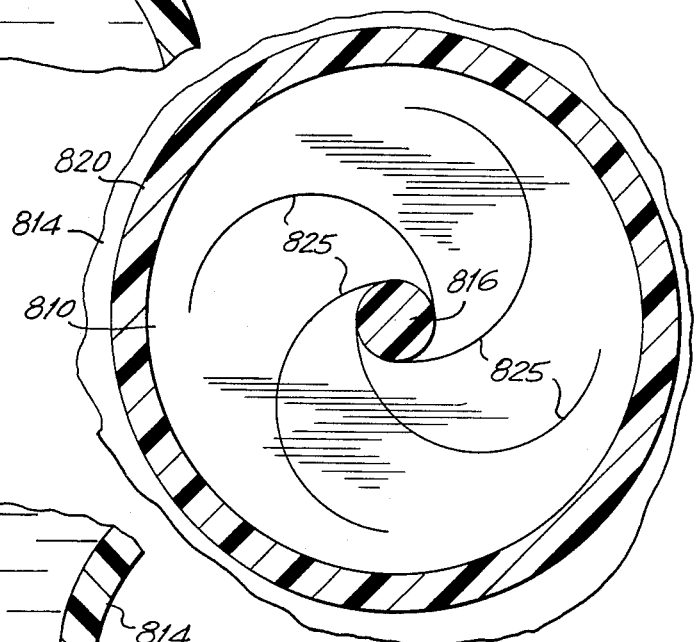
FIG. 9 is a transverse cross-sectional view along the line 9—9 of FIG. 8.
Figure 10:
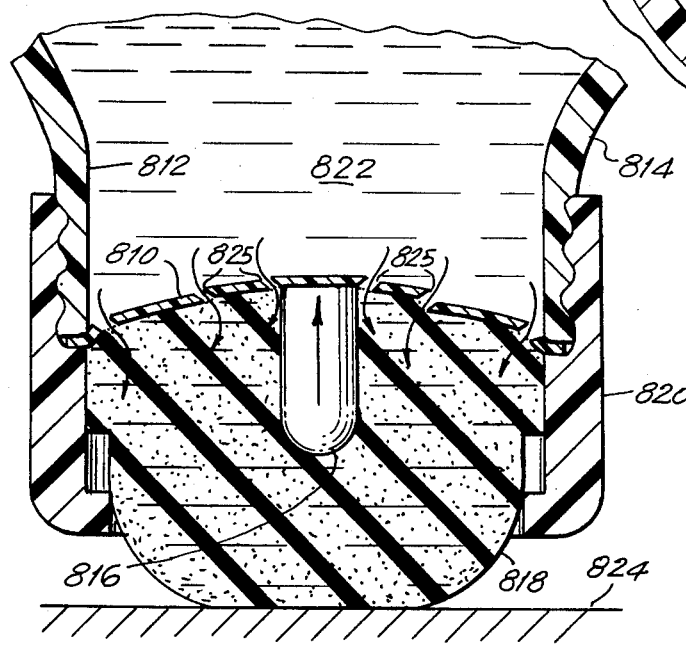
FIG. 10 is a vertical cross-sectinal view of the valve of FIG. 8 showing the valve pressed into an open position.

Another practical application of the invention is shown in FIGS. 8, 9 and 10. As illustrated, the valve 810 is fastened in any suitable manner across the mouth 812 of container 814. Formed unitarily by molding, cementing or otherwise and projecting outwardly from the center of valve 810 is a pin 816. Pin 816, in turn, is surrounded by a porous cushion 818 which forms the actual applicator. Cushion 818 may be held in place by undercut applicator housing 820 threadably connected, or snap or force fitted to the mouth 812 of container 814. In this construction, housing 820 also holds diaphragm 810 in place across the mouth.

When it is desired to apply the fluid to the surface 824, the container 814 is turned upside-down, at which time the fluid will still remain therein. However, when the cushion 818 is pressed against surface 824, it presses against pin 816 which in turn moves the center of valve 810 axially inwardly. Slits 825 are thus opened and the fluid 822 under the force of gravity passes through the valve, penetrates cushion 818 and is thence applied to the desired surface. If the cushion is sufficiently domed and dense, the pin 816 may be eliminated.

It must be emphasized that while the specific structural arrangement shown in FIGS. 8, 9 and 10 is properly illustrative of the invention, depending upon the size of the container, particularly the diameter of the mouth, and the type of fluid, other physical arrangements may be equally satisfactory without altering the basic principles involved. For example, the diaphragm 810 may be cemented to or otherwise effectively made a part of the periphery of mouth 812, and cushion 818 formed of flexible porous material such as sponge rubber may in turn be fused to the top of diaphragm 810. If this structural arrangement is used, an undercut screw-on applicator housing 820 will be unnecessary.

Figure 11:
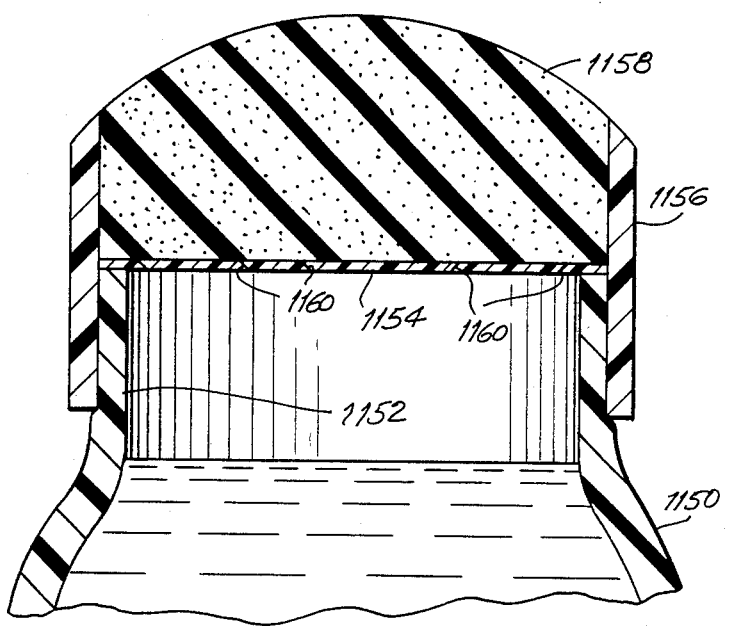
FIG. 11 is a vertical cross-sectional view of an additional modified form of valve in closed position.
Figure 12:
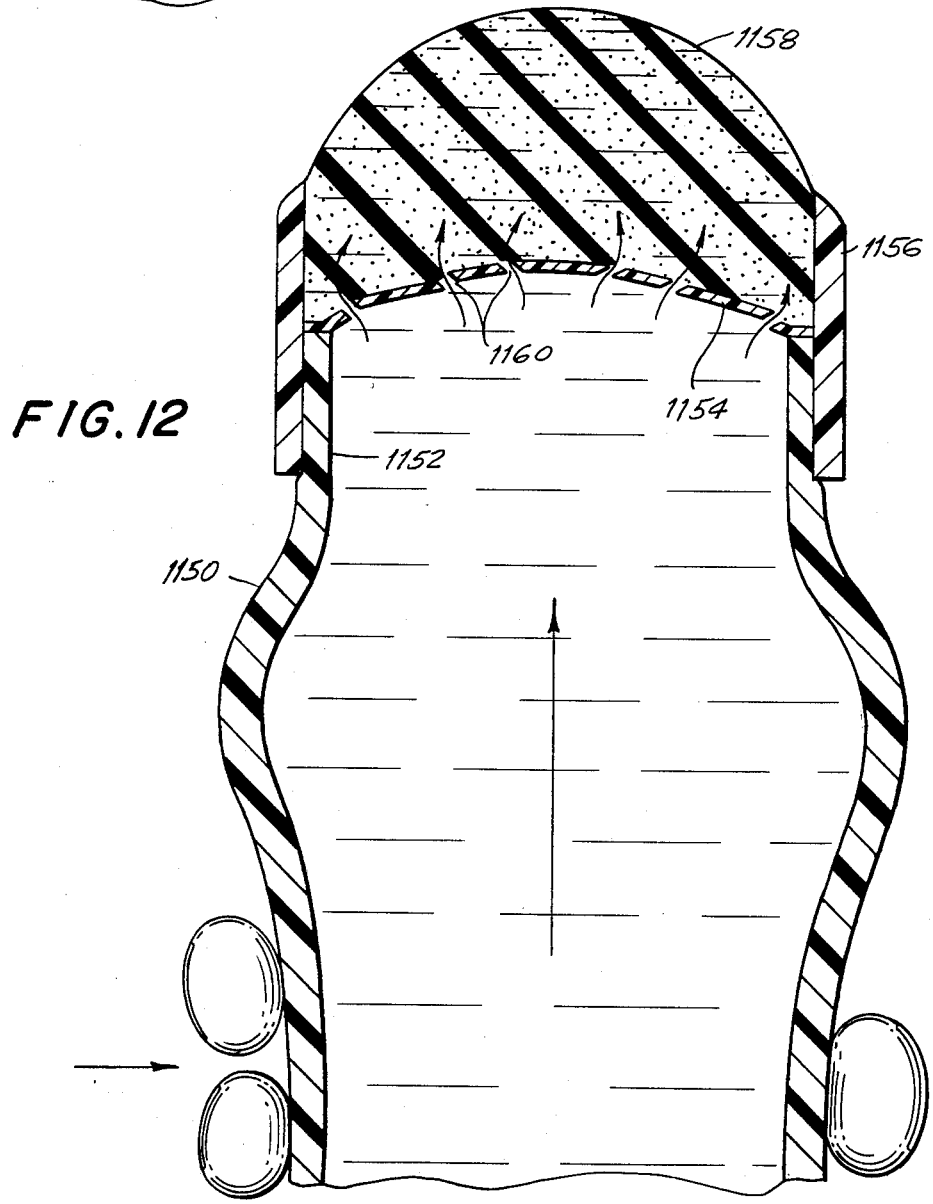
FIG. 12 is a similar view of the valve of FIG. 11, in open position.

The principles behind the present valve structure can be applied to controlling the exodus of fluid from a soft squeezable container as illustrated in FIGS. 11 and 12. Here container 1150, in this case perhaps of soft metal, has an exit mouth 1152 across which is sealed or otherwise attached diaphragm 1154 having slits 1160. Within collar 1156 is positioned cushion or applicator 1158 which may be cemented to the upper surface of diaphragm 1154. In all substantial respects, the valve arrangement still can be almost identical with that shown in FIGS. 7a and 7b.

When it is desired to project fluid from the flexible container, the latter, when squeezed, will force the fluid against diaphragm 1154 axially opening up the slits 1160 as shown in FIG. 7b. Since the container is otherwise sealed, upon release of squeezing pressure the restorative force of the diaphragm 1154 will cause it to return to its original position (FIG. 11) and the container will again be effectively sealed by closure of the valve.

In the form of invention shown in FIGS. 11 and 12, the initial cuts may not go through all the way (see FIG. 7a) to provide an initial seal to the container as previously described.

Turning now to FIG. 6, a simple method and apparatus is disclosed for providing angular slits in substantially planar diaphragms 12, 112, 212, 312, 810 and 1154 to make valves in accordance with the present invention. Specifically, a mechanism is shown in FIG. 6 for producing slits in diaphragms 12, 112, 212, 312, 810 and 1154 that are angled as in FIGS. 7a and 7b. The slitting apparatus of FIG. 6 is generally designated by the reference numeral 450 which includes a base support member 452 into which is press-fitted stationary upwardly protruding stud 454 having a non-planar, preferably hemispherical upper surface 456. The stud 454 protrudes beyond the upper surface 458 of the lower base member 452. An upper member 460 is provided which member is preferably provided with a central cavity 462 which is proportioned to receive therewithin the cup-shaped diaphragm forming member made up of a diaphragm 12, 112, etc. and a wall 118, as in FIG. 2, for example. The cup-shaped structure is press-fitted down into the central cavity 462 in the upper member 460 with the outer flange 119 extending outwardly to provide a downward stop.

The cutting mechanism further includes a suitable upper die 464 that is slidably disposed within a sleeve 466 that is itself movable into an impinging relation with the flange 119. The bottom surface of the vertically movable upper die 464 is a concave surface 468 complementary to surface 456, with a cutting edge 470 shaped to cut a slit 14.

In use, an uncut diaphragm blank made up of a diaphragm, a peripheral wall and a flange is press-fitted into the complementary cavity in the upper member 460. The movable upper die 464 with its sleeve 466 are then moved downwardly to cause the sleeve 466 to impinge against the diaphragm and hold the blank in its position. The upper cutting die 464 then continues to move downwardly until it engages the planar diaphragm and deforms it into a hemispherical configuration. Continued movement of upper die 464 will produce one or more arcuate slits, be they partial slits as shown in FIG. 7a or a complete slit as shown in FIGS. 2 and 3. However, due to the deformation of the diaphragm by the curved surfaces, the cutting edge 470 will move through the diaphragm in the direction of the axis of movement of the upper die 464 at an angle to the normal plane of the diaphragm. When the cutting die 464 is moved upwardly to remove it from the blank 112-118-119, the diaphragm 112 will resume its substantially planar shape, whereby to result in the slit or slits formed therein to be at an angle to the plane of the now undeformed diaphragm, as shown in FIGS. 7a and 7b. This technique, as already noted, may be employed to cut partial slits as shown in FIG. 7a or complete angular slit wherein the slit of FIG. 7a is completed. The extent of the slit is dependent wholly upon the proportioning of the parts of the apparatus 450 of FIG. 6 and upon the degree of movement of the upper die within such apparatus.

It will be recognized that numerous modifications may be made within the present invention without departing from the spirit or scope thereof. So long as there is more than one arcuate slit in the diaphragm, the number of slits is nor critical, although 3 is presently the preferred number. It is also presently preferred, although not absolutely necessary to the practice of the present invention, that the slits be equiangularly distributed around the diaphragm relative to the center thereof. The particular material from which the diaphragm is formed is not critical to the present invention so long as the material is elastically deformable, preferably with a substantially large restoring force, and such material is impermeable to the fluid whose flow is being controlled by the valve formed from the diaphragm. Within such parameters, the present invention is defined as hereinafter set forth in the claims annexed hereto.

What is claimed is:

1. A pressure-responsive valve for controlling the flow of a fluid, said valve comprising an elastically deformable diaphragm having a plurality of non-intersecting, non-meeting, separate arcuate slits, each slit having a base which is intersected by at least one other slit, and each slit being out of intersecting relation with its own base.

2. A valve according to claim 1, wherein said diaphragm is formed of an elastically deformable metal.

3. A valve according to claim 1, wherein said diaphragm is formed from an elastically deformable plastic material.

4. A valve according to claim 3, wherein said plastic material is taken from the group consisting of polyethylene, polypropylene, polyvinylchloride, and polystyrene.

5. A valve according to claim 1, wherein the number of arcuate slits is at least 3.

6. A valve according to claim 5, wherein said diaphragm is a metal diaphragm.

7. A valve according to claim 5, wherein said diaphragm is formed from an elastically deformable plastic material.

8. A valve according to claim 7, wherein said plastic material is taken from the group consisting of polyethylene, polypropylene, polyvinylchloride, and polystyrene.

9. A closure for sealing a passageway from the flow of fluid therethrough, said closure comprising an elastically deformable diaphragm made of material impermeable to said fluid, said diaphragm having a plurality of non-intersecting, non-meeting, separate slits, each slit having a base which is intersected by at least one other slit, and each slit being out of intersecting relation with its own base, wherein said slits only partially penetrate said diaphragm whereby to maintain the impermeability thereof, the material being readily severable at said partially penetrating slits whereby to convert said closure into a pressure-responsive valve.

10. A closure according to claim 9, wherein the diaphragm is formed from an elastically deformable plastic material.

11. A closure according to claim 10, wherein said plastic material is taken from the group consisting of polyethylene, polypropylene, polyvinylchloride, and polystyrene.

12. A closure for sealing a passageway to the flow of fluid therethrough, said closure comprising an elastically deformable diaphragm formed of fluid impermeable material, said diaphragm having at least three non-intersecting, non-meeting, separte arcuate slits, each slit having a base which is intersected by at least one other slit, and each slit being out of intersecting relation with its own base, wherein said slits only partially penetrate said diaphragm for creating a closure which is breakable along said partially penetrating slits for converting said closure into a pressure-responsive valve.

13. A closure according to claim 12, wherein the diaphragm is formed from an elastically deformable plastic material.

14. A closure according to claim 13, wherein said plastic material is taken from the group consisting of polyethylene, polypropylene, polyvinylchloride, and polystyrene.

* * * * *